(12) United States Patent
Lei (10) Patent No.: US 8,485,559 B2
(45) Date of Patent: Jul. 16, 2013

(54) DOCUMENT AUTHENTICATION USING TEMPLATE MATCHING WITH FAST MASKED NORMALIZED CROSS-CORRELATION

(75) Inventor: Yiwu Lei, Ottawa (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/332,451

(22) Filed: Dec. 21, 2011

(65) Prior Publication Data

US 2012/0106851 A1 May 3, 2012

Related U.S. Application Data

(62) Division of application No. 11/491,869, filed on Jul. 24, 2006, now Pat. No. 8,096,584.

(51) Int. Cl.
| | |
|---|---|
| *B42D 15/00* | (2006.01) |
| *B42D 15/10* | (2006.01) |
| *G09C 3/00* | (2006.01) |
| *G06K 9/64* | (2006.01) |
| *G06K 9/36* | (2006.01) |
| *G06K 9/20* | (2006.01) |

(52) U.S. Cl.
USPC ............... 283/72; 283/67; 283/70; 283/74; 283/901; 382/278; 382/280; 382/282; 382/283

(58) Field of Classification Search
USPC .......... 283/67, 70, 72, 74, 117, 901; 382/100, 382/112, 135, 181, 217, 218, 278, 280, 282, 382/283, 312
See application file for complete search history.

(56) References Cited

U.S. PATENT DOCUMENTS

| 3,801,183 A | 4/1974 | Sevelin |
| 5,841,907 A | 11/1998 | Javidi |

(Continued)

FOREIGN PATENT DOCUMENTS

| EP | 0268450 | 5/1988 |
| WO | WO 2006/048368 | 5/2006 |

OTHER PUBLICATIONS

Supplementary European Search Report in European Patent Application No. 07 81 2571, dated Sep. 26, 2011.

(Continued)

*Primary Examiner* — Dana Ross
*Assistant Examiner* — Justin V Lewis (57) ABSTRACT

Techniques are described for authenticating security documents having security images that incorporate multiple security features. The techniques may produce robust template matching results in situations of lighting unevenness, even with stronger occluding objects. The techniques may be particularly useful in validating a security document having a security image composed of one or more "virtual" retroreflective images formed over a background of a repeating retroreflective image. The virtual retroreflective images within the security image provide strong signals that may dominate analysis and validation of the background retroreflective image, thereby resulting incorrect authentication. The techniques provide a modified normalized cross-correlation analysis that masks out the strong signals contributed by the additional security features, such as the retroreflective virtual images, while still allowing for fast and efficient template matching to be performed with respect to the background image.

11 Claims, 6 Drawing Sheets

U.S. PATENT DOCUMENTS

| | | |
|---|---|---|
| 6,288,842 B1 | 9/2001 | Florczak |
| 6,301,387 B1 | 10/2001 | Sun |
| 8,611,612 | 8/2002 | Mann |
| 6,584,224 B2 | 6/2003 | Sun et al. |
| 6,678,414 B1 | 1/2004 | Loce |
| 6,686,922 B2 | 2/2004 | Loce |
| 6,744,909 B1 | 6/2004 | Kostrzewski |
| 6,785,405 B2 * | 8/2004 | Tuttle et al. .................. 382/112 |
| 6,807,304 B2 | 10/2004 | Loce |
| 7,085,418 B2 | 8/2006 | Kaneko |
| 7,149,356 B2 | 12/2006 | Clark |
| 8,096,584 B2 | 1/2012 | Lei |

OTHER PUBLICATIONS

J.P. Lewiss, "Fast Normalized Cross-Correlation," Vision Interface, 7 pages, 1995.

D. Tsai et al., "Fast Normalized Cross Correlation for Defect Detection," Pattern Recognition Letters, vol. 24, Issue 15, pp. 2003.

K. Briechle et al., "Template Matching Using Fast Normalized Cross Correlation," Proceedings of SPIE, vol. 4387, 9 pages, Mar. 2001.

P. Nillius et al., "Fast Block Matching with Normalized Cross-Correlation using Walsh Transforms," Department of Numerical Analysis and Computer Science, 10 pages, Sep. 2002.

* cited by examiner

DOCUMENT AUTHENTICATION USING TEMPLATE MATCHING WITH FAST MASKED NORMALIZED CROSS-CORRELATION

CROSS-REFERENCE TO RELATED APPLICATIONS

This application is a divisional of U.S. patent application Ser. No. 11/491,869, filed Jul. 24, 2006 now U.S. Pat. No. 8,096,584, now allowed, the disclosure of which is incorporated by reference in its entirety herein.

TECHNICAL FIELD

The invention relates to computer-aided authentication of security documents, such as passports, driver's licenses, birth certificates, or financial documents, based on image pattern confirmation.

BACKGROUND

Computer-aided techniques are increasingly being used to validate the authenticity of security documents. Examples of security documents include passports, credit cards, ID cards, driver's licenses, birth certificates, commercial paper and financial documents. In some cases, security images are printed on, embossed in, engraved in, or affixed to the security documents to aid detection of counterfeiting or use of unauthorized documents generally. That is, the security images can include one or more security features, such as ultraviolet ink, retroreflective 3M Confirm™ images, and retroreflective virtual images that are difficult to reproduce and, therefore, lead to more reliable validation of the security documents and increased detection of unauthorized documents.

SUMMARY

In general, the invention relates to techniques for authenticating security documents having security images that incorporate multiple security features. The common situation in image template matching techniques is to detect a strong signal pattern from a quiet background, or with weak noise interference. Occlusion caused by other security features complicates the confirmation of an expected image pattern, especially when the occluding objects have a stronger signal than the image pattern. The techniques may be particularly useful in validating a security document having a security image composed of one or more "virtual" retroreflective images formed over a background of a repeating retroreflective confirm image.

As further described herein, the virtual retroreflective images within the security image provide stronger signals that may dominate analysis and validation of the background retroreflective confirm image, thereby resulting in incorrect authentication. The techniques provide a modified normalized cross-correlation analysis that masks out the strong signals contributed by the additional security features, such as the one or more retroreflective virtual images, while still allowing for fast and efficient template matching to be performed with respect to the background image.

In one embodiment, a method comprises capturing an image of at least a portion of a security document, wherein the portion of the security document includes a security image having a first retroreflective feature and a second retroreflective feature, calculating a modified normalized cross-correlation between a reference image associated with the first retroreflective feature and the captured image using a masking image generated from the captured image, and outputting indicia of one or more matches between the reference image and the captured image.

In another embodiment, a security document authentication device comprises an image capture interface to receive a captured image of at least a portion of an article, wherein the portion of the article includes a security image having a first retroreflective feature and a second retroreflective feature. The authentication device also includes a fast masked normalized cross-correlation (FMNCC) module to calculate a modified normalized cross-correlation between a reference image associated with the first retroreflective feature and the captured image using a masking image generated from the captured image, and a display to output indicia of one or more matches between the reference image and the captured image.

In another embodiment, a security document authentication system comprises an image capture device that captures at least a portion of an image of an article, wherein the portion of the article includes a security image having a first retroreflective feature and a second retroreflective feature, and a host system that calculates a modified normalized cross-correlation between a reference image associated with the first retroreflective feature and the captured image using a masking image generated from the captured image, and outputs indicia of one or more matches between the reference image and the captured image.

In yet another embodiment, a method comprises capturing an image of at least a portion of a document, wherein the portion of the document includes an image having a first feature and a second feature. The method further includes calculating a modified normalized cross-correlation between a reference image associated with the first feature and the captured image using a masking image generated based on the captured image, and outputting indicia of one or more matches between the reference image and the captured image.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
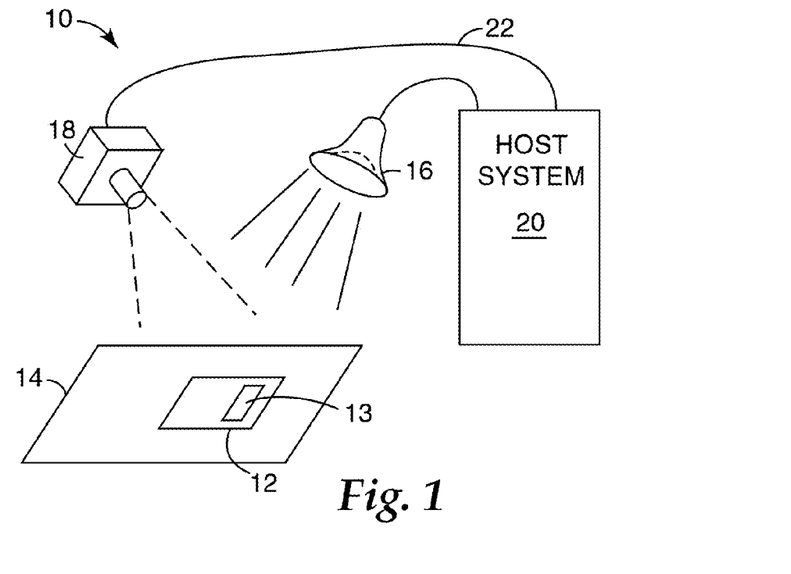
FIG. 1 is a schematic representation illustrating an exemplary document authentication system that analyzes security documents in accordance with the principles of the invention.

FIG. 1 is a schematic representation illustrating an exemplary document authentication system 10 for analyzing a security document 12 in accordance with the principles of the invention. Security document 12 includes at least one security image 13 that includes one or more security features. Document authentication system 10 may be used to authenticate or validate security document 12, such as by verifying that security document 12 possesses certain security features. The security features may be, for example, retroreflective images, retroreflective virtual images, or other types of images printed on, embossed in, or affixed to security document 12.

Security document 12 may be, for example, a passport, driver's license, identification card, title document, or other article. Document authentication system 10 may be used to verify the authenticity of the passport by determining whether security image 13 contains a retroreflective image that matches a stored reference retroreflective image, also referred to as a "template" image. Document authentication system 10 may perform this determination by capturing an image of the security image 13 or of the entire face of the security document 12, and analyzing the captured image to determine whether one or more occurrences of the reference image are present within the captured image. If the reference image is present within the captured image, document authentication system 10 provides an indication (e.g., audible and or visual) that security document 12 has been properly verified. If the reference image is not present within the captured image, document authentication system 10 provides an indication that security document 12 cannot be automatically verified and may be denied.

In some embodiments security image 13 may include additional security features. For example, in addition to containing one or more image regions matching the reference image, security image 13 may include a retroreflective virtual image (e.g., a "floating" image) as an additional security feature. Exemplary techniques for forming a floating image within security image 13 are described in U.S. Pat. No. 6,288,842, entitled "Sheeting With Composite Image that Floats" to Florczak et al., hereby incorporated herein by reference. As another example, security image 13 may include ultraviolet patterns, printed visible patterns, or biometric features such as fingerprints.

The retroreflective image and other security features contained within security image 13 may render template matching more difficult when using conventional template matching techniques. In particular, the security features, such as the retroreflective virtual image, may produce a stronger signal within the captured image relative to the signal representative of the reference image, thereby making it difficult to verify that security image 13 includes an authentic reference image. For this reason, host system 20 of document authentication system 10 uses a "fast masked normalized cross-correlation" (FMNCC) technique described herein to effectively and efficiently mask out any signals present in the captured image that are due to the additional security features. Host system 20 applies the FMNCC technique to the captured image to provide fast template matching analysis and authentication or denial of security document 12.

In operation, a user places security document 12 onto view frame 14. View frame 14 accurately locates security document 12 with respect to other components of document authentication system 10. In the exemplary embodiment of FIG. 1, document authentication system 10 includes a light source 16 to illuminate security document 12 placed onto view frame 14. Light source 16 may be arranged at an angle relative to a viewing position. In some embodiments, document authentication system 10 may include more than one light source. Document authentication system 10 further includes an image capture device 18 arranged at the viewing position. Image capture device 18 may be a camera, such as a charge coupled device (CCD), a line scanner or other optical input device. Light source 16 and image capture device 18 may be controlled by host system 20. The intensity of light source 18 may be adjusted through a range of intensities from a minimum value to a maximum value either automatically by host system 20 or based on input from the user.

After the user has placed security document 12 into view frame 14, image capture device 18 captures an image of security document 12 that includes security image 13. The captured image may represent all or a portion of security document 12, provided the portion includes security image 13. Image capture device communicates the captured image to host system 20 for image processing via signal path 22. Captured images processed by host system 20 can be displayed for examination on a display (not shown) associated with host system 20. Host system 20 may be, for example, a computer, laptop, mobile personal digital assistant (PDA) or other computing system having sufficient processor and memory resources to analyze the captured image. Example configuration and operation of host system 20 are described in further detail below.

Figure 2:
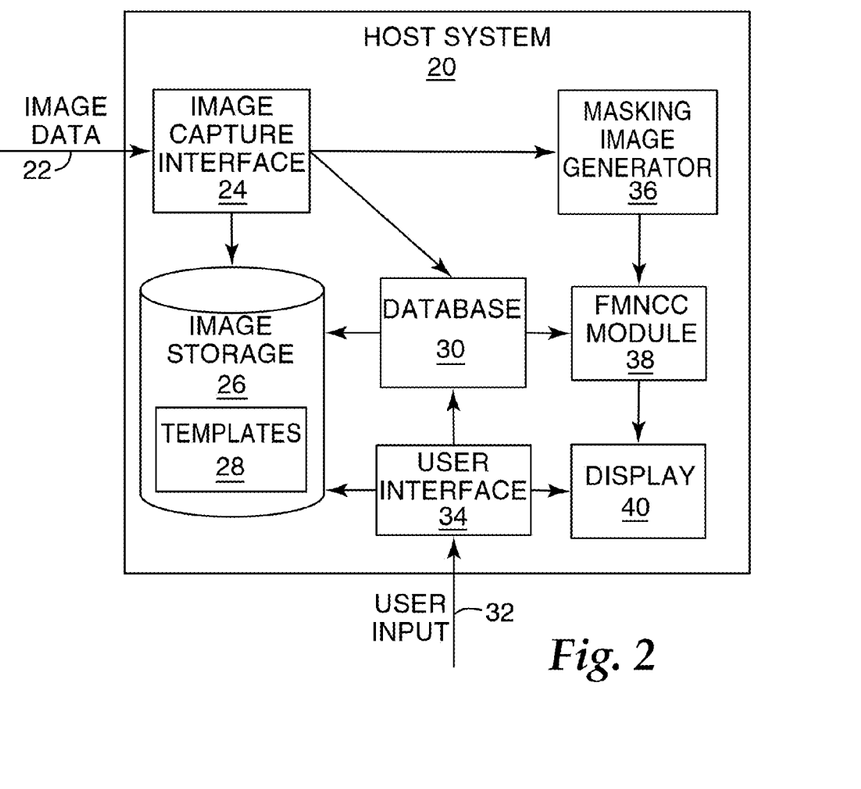
FIG. 2 is a block diagram illustrating an exemplary host system that uses a fast masked normalized cross-correlation technique to analyze security documents in accordance with the principles of the invention.

FIG. 2 is a block diagram illustrating an exemplary host system 20 that uses a fast masked normalized cross-correlation technique to analyze security documents in accordance with the principles of the invention. Host system 20 analyzes image data received from image capture device 18 (FIG. 1) to determine whether a given reference image may be found within (i.e., matched to) the captured image.

Host system 20 includes an image capture interface 24 to receive the image data from image capture device 18 via signal path 22. Image capture interface 24 may be, for example, a serial or parallel hardware interface for communicating with image capture device 18 and receiving image data. As another example, image capture interface 24 may be a universal serial bus (USB) interface. Host system 20 may store the received image data in image storage 26, e.g., as one or more files, and may update database 30 to reflect the location of the image data within image storage 26. Image storage 26 may be an internal or external persistent storage medium, such as a hard disk, optical disk, tape, removable memory card or the like.

Host system 20 may also receive user input 32 via user interface 34, and may update database 30 in response to the user input. User input 32 may include, for example, selection of a reference image from a library of reference images, stored as templates 28 within image storage 26. The library of reference images may include a plurality of reference images of particular security features associated with different types of security documents. The reference images are used to verify the authenticity of a security document, such as a passport, driver's license, financial document or other security document.

The image data received by image capture interface 24 via signal path 22 may represent a captured image of all or a portion of security document 12. As discussed above, the captured image may contain primary security features and additional security features, such as a retroreflective virtual image. Host system 20 calculates a modified normalized cross-correlation between the reference image and the captured image. In particular, masking image generator 36 generates a "masking image" representing the regions of the captured image containing stronger signals, or other obvious image features, due to the additional security features, and applies the masking image to remove the effect of the additional security features from the normalized cross-correlation calculation.

Masking image generator 36 dynamically builds the masking image in real time, wherein the masking image has the same dimensionality as the portion of the captured image associated with secure image 13. In one embodiment, masking image generator 36 may build the masking image by thresholding the images of the captured image on a pixel-by-pixel basis to locate regions of high signal strength, i.e., image regions that are very bright or very dark. Masking image generator 36 may also perform some morphology processing. For example, masking image generator 36 may produce the masking image by setting the pixels of the masking image to either a highest brightness value (e.g., 255 for an 8-bit pixel) or a lowest brightness value (e.g., 0) based on whether a brightness value of a corresponding pixel within the captured image falls within or outside a pre-defined range of brightness values. As one example, when a pixel of the captured image has a brightness value outside of a range from 50-200 (i.e., less than 50 or greater than 200), masking image generator 36 may set a corresponding pixel within the masking image to a brightness value of 0 (black); and where the pixel of the captured image has a brightness value that falls within the range of 50 to 200, masking image generator 36 may set the corresponding pixel of the masking image to a brightness value of 255 (white). Several rounds of dilation and erosion could significantly improve the shape of the masking region. The particular range and method used to build the masking image may vary according to a type or characteristics of the security image 13 or the characteristics of the security features contained within the security image. Masking image generator 36 may also include multiple pre-defined ranges of brightness, which vary depending on the type of document being analyzed. The range of brightness values may also be dynamically estimated. Masking image generator 36 may also statistically pre-compute the masking image in advance.

Masking image generator 36 provides the masking image to fast masked normalized cross-correlation (FMNCC) module 38. FMNCC module 38 obtains the captured image from image storage 26, and applies the masking image to the captured image to produce a "masked" image. The masked image may be considered a version of the captured image, but with any strong signals caused by the additional security features, e.g., a retroreflective floating image, being at least in part filtered. FMNCC module 38 calculates and normalizes the cross-correlation between the reference image and the masked image, and compensates the result by multiplying by the ratio of the template size to the masked area at the respective match. Based on the result of these calculations, collectively referred to as one embodiment of FMNCC, host system 20 may determine pixel regions within the captured image that sufficiently match the reference image, referred to as matching regions.

FMNCC module 38 may find the reference image at a plurality of regions within the masked image. When a match is identified, host system 20 produces a positive indication, e.g., an audible and/or visual indicator of the match. For example, host system 20 may display a visual representation of all or a portion of the captured image and the matching regions within the captured image via display 40. Alternatively, if FMNCC module 38 finds no sufficient match to the reference image in the masked image, host system 20 outputs a negative indicator (audio or visual) to indicate denial of security document 13. For example, host system 20 may display a message indicating no matches were found or other suitable error message.

Figure 3:
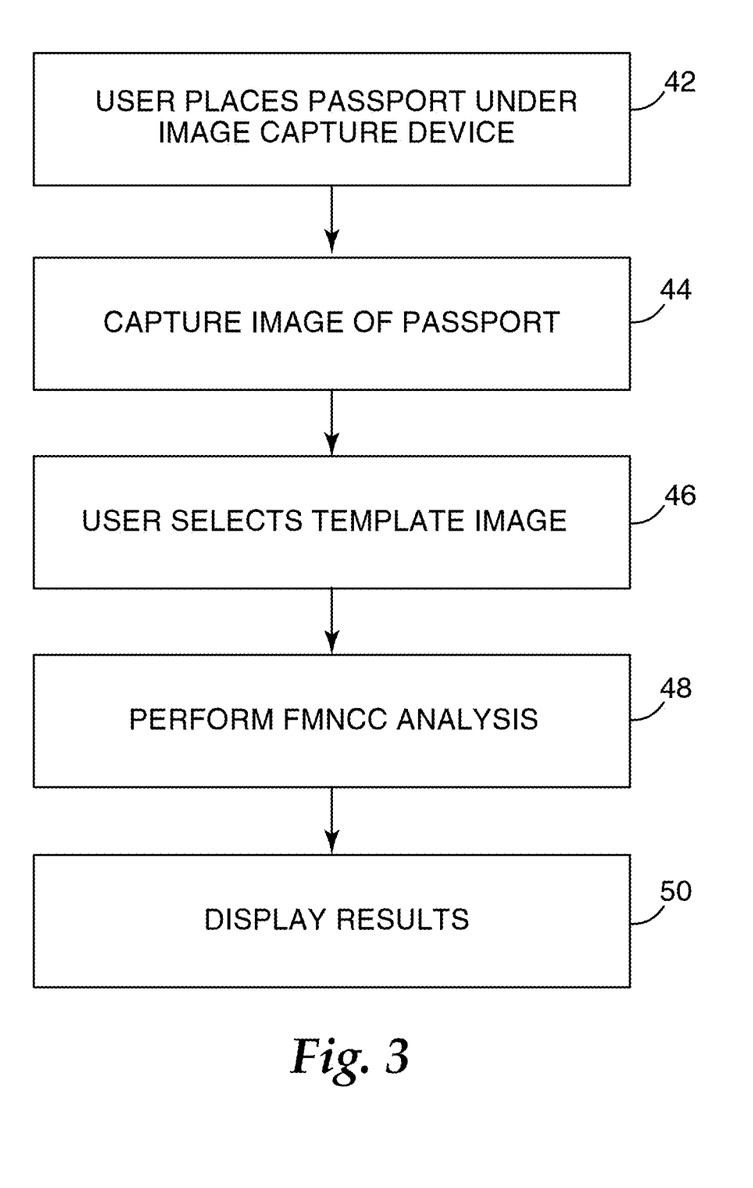
FIG. 3 is a flowchart illustrating example operation of the document authentication system of FIG. 1.

FIG. 3 is a flowchart illustrating example operation of the document authentication system 10 of FIG. 1. Initially, host system 20 stores one or more reference images 28 to image storage 26. Next, a user places a security document 12, such as a passport, under image capture device 18 (42). Host system 20 receives and stores a captured image of the security document 12 using image capture device 18 and light source 16 (44).

Host system 20 may identify the type of security document 12 being authenticated manually or automatically using various characteristics. Based on the identification, host system 20 selects one or more reference images for the document type from among templates 28 (46). For example, the user may manually select the reference image via user interface 34. Alternatively, host system 20 may employ an automatic document identifier to automatically or semi-automatically select the reference image based on characteristics of the captured image (e.g., document size, machine-readable zone (MRZ), or other text optical character recognition (OCR) or automated recognition of certain pre-defined markings). As another example, host system 20 may use a default reference image for each type of security document 12.

After selecting the template, host system 20 performs fast masked normalized cross-correlation (FMNCC) analysis to determine a cross-correlation between the captured image and the reference image (48). In this manner, host system 20 determines whether one or more instances of the reference image are present within the captured image. This analysis is described in further detail below. Host system 20 may display results of the FMNCC analysis on display 40 or produce any other suitable audio or visual indicator (50).

Figure 4:
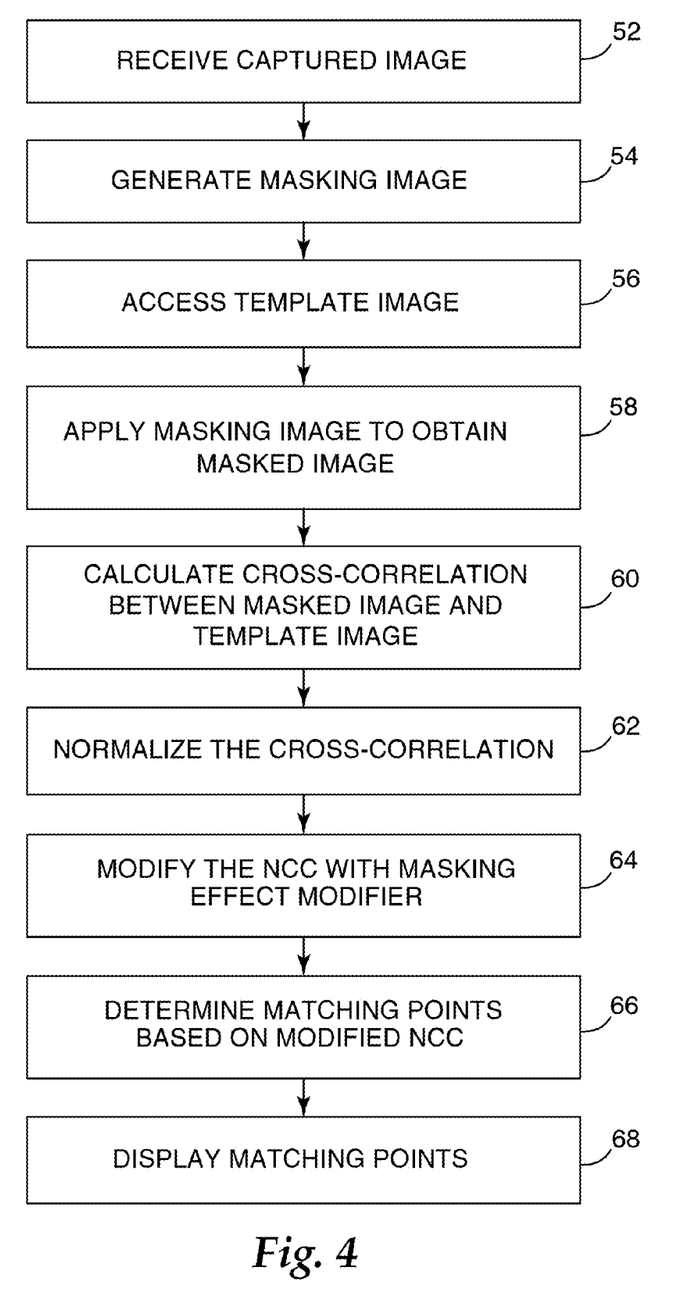
FIG. 4 is a flowchart illustrating example operation of the host system of FIG. 2.

FIG. 4 is a flowchart illustrating example operation of host system 20 of FIG. 2 in further detail. Host system 20 authenticates security document 12 by analyzing a captured image associated with the security document. As described above, host system 20 receives a captured image of security document 12 via image capture interface 24 (52), and may store the captured image to image storage 26. FMNCC module 38 generates a masking image m(x, y) from the captured image, e.g., by thresholding the captured image as described above with respect to FIG. 2 (54). In addition, host system 20 accesses a reference image from templates 28 of image storage 26 (56).

FMNCC module 38 then uses the masking image to remove undesired objects from a normalized cross-correlation between the reference image and the masking image. More specifically, FMNCC module 38 applies the masking image to the captured image to obtain a masked image $f_m(x, y)$ (58). FMNCC module 38 may do this by introducing the masking image, represented by m(x, y), into a normalized cross-correlation calculation between the reference template image t(x, y) and the captured image f(x, y). The normalized cross-correlation between the template image and the captured image is given by:

$$\gamma(u, v) = \frac{\sum_{x,y} [t(x, y) - \bar{t}][f(x+u, y+v) - \bar{f}_{u,v}]}{\left\{\sum_{x,y} [t(x, y) - \bar{t}]^2 \sum_{x,y} [f(x+u, y+v) - \bar{f}_{u,v}]^2\right\}^{0.5}}, \quad (1)$$

where $\bar{t}$ is the mean of the template and $\bar{f}_{u,v}$ is the mean of the captured image f(x, y) in the region under the template image.

The equation for the normalized cross-correlation $\gamma_m(x, y)$ with the masking image applied onto the captured image is given by:

$$\gamma_m(u, v) = \frac{\sum_{x,y} m(x+u, y+v)[t(x, y) - \bar{t}][f(x+u, y+v) - \bar{f}_{u,v}]}{\left\{\sum_{x,y} m(x+u, y+v)[t(x, y) - \bar{t}]^2 \sum_{x,y} m(x+u, y+v)[f(x+u, y+v) - \bar{f}_{u,v}]^2\right\}^{0.5}} \quad (2)$$

$$= \frac{\sum_{x,y} [t(x, y) - \bar{t}][f_m(x+u, y+v) - \bar{f}_{mu,v}]}{\left\{\sum_{x,y} m(x+u, y+v)[t(x, y) - \bar{t}]^2 \sum_{x,y} [f_m(x+u, y+v) - \bar{f}_{m(u,v)}]^2\right\}^{0.5}},$$

where $\bar{t}$ is the mean of the template and $\bar{f}_{u,v}$ is the mean of f(x, y) in the region under the template at the position (u, v) and $\bar{f}_{m(u,v)}$ is the respective mean of the masked image, $f_m(x, y)$.

Rearranging equation (2) results in the following equation:

$$\gamma_m(u, v) = \frac{\left\{\sum_{x,y} [t(x, y) - \bar{t}]^2\right\}^{0.5}}{\left\{\sum_{x,y} m(x+u, y+v)[t(x, y) - \bar{t}]^2\right\}^{0.5}} \gamma'_m(u, v), \quad (3)$$

where $\gamma'_m(u,v)$ is the normalized cross-correlation between the template image t(x, y) and the masked image $f_m(x, y)$, and $\gamma'_m(u,v)$ is corrected by a modifier. The denominator of this modifier is in the form of cross-correlation between the masking image and the reference template image. In some instances a fast Fourier transform (FFT) may be used to improve calculation efficiency of a cross-correlation. However, introduction of the masked image complicates the matter by introducing another convolution in the denominator, thereby increasing the overall computational complexity of the cross-correlation as well as making it more difficult to improve calculation efficiency.

In order to improve the calculation efficiency, it is recognized herein that the denominator of the modifier is the sum of the square of each pixel in the portion of the captured image that is filtered out by the masking image, so this modifier in equation (3) represents the ratio of the sum of the square of each pixel in the reference image to the sum of the square of each pixel in this masked out portion. In many embodiments, the reference image consists of a graphic pattern that has approximately equal lightness throughout. For these embodiments, we can assume that the signal is uniformly present throughout the reference image, i.e., that the signal exists equally in every part of the reference image. By assuming that the signal is uniformly distributed throughout the reference image, we can assume that the variance σ of the whole reference image should be close to the variance $\sigma_m$ of the masked part.

Thus, based on this recognition, we can simplify equation (3) to obtain the following equation:

$$\gamma_m(u, v) = \frac{\{M_t \times N_t\} \times \sigma}{\left\{\sum_{x,y} m(x+u, y+v)\right\}^{0.5} \times \sigma_m} \gamma'_m(u, v), \quad (4)$$

$$\approx \left\{\frac{\{M_t \times N_t\}}{\sum_{x,y} m(x+u, y+v)}\right\}^{0.5} \gamma'_m(u, v), \quad (5)$$

where σ is the variance of the whole reference image and $\sigma_m$ is the variance of the masked part, $M_t$ and $N_t$ define the dimensions of the reference image, and $\gamma'_m(u, v)$ is the normalized cross-correlation of the reference image and the masked image. If we let the modifier, referred to now as the masking effect modifier, be estimated by the ratio of the template size to the masked area at each matching region, equation (5) can be generalized as:

$$\gamma_m(u, v) \approx \left\{\frac{\{M_t \times N_t\}}{\sum_{x,y} m(x+u, y+v)}\right\}^{\alpha} \gamma'_m(u, v), \quad (6)$$

where α represents the modification strength.

In practice, using a value of α=1 gives a fast and good approximation of $\gamma'_m(u, v)$, the normalized cross-correlation between the reference image and the masked image. This simplification enables FMNCC module 38 to apply an FFT to improve the efficiency of the calculation. FMNCC module 38 obtains the final result by calculating the cross-correlation between the masked image and the reference image using FFT (60) and normalizing the cross-correlation (62) (in other words, calculating $\gamma'_m(u,v)$), and modifying the normalized cross-correlation by the masking effect by multiplying $\gamma'_m(u, v)$ with the masking effect modifier (64). In certain embodiments, FMNCC module 38 may make this calculation at a speed on the order of hundreds of milliseconds where host system 20 includes a general purpose processor, e.g., a 2 GHz processor.

Host system 20 determines whether any matching regions exist based on the results of the fast masked normalized cross-correlation analysis described above. In particular, host system utilizes the results of the fast-masked normalized cross-correlation techniques described above to determine whether any regions within the captured image sufficiently match the reference image. Host system 20 may determine whether any matching regions are found within the captured image based on a predefined score threshold. As one example, a predefined score threshold may require a correlation score of at least 75 on a scale of 0 to 100. In some embodiments, host system may determine whether any matching regions are found within the captured image based on a minimum required number of matches having a correlation score above the predefined score threshold. As one example, host system 20 may be configured such that for any matching regions to be found, at least 3 matching regions must have a correlation score above the predefined score threshold. In some example embodiments, different predefined score thresholds may be defined for different document types.

In some embodiments, host system 20 displays all or a portion of the captured image on display 20, and identifies any regions therein that sufficiently match the reference image 40 (66). For example, host system 20 may display the captured image of the security document with the matching regions highlighted. As another example, host system 20 may present a list of matching regions, e.g., a center pixel in the matching region of the captured image that matches the reference image. The matching regions may be shown with a corresponding correlation score, e.g., from 0-100. FMNCC module 38 may identify matching regions even where the matched image is rotated with respect to the reference image. Host system 20 may indicate such rotation when the matches are displayed. Alternatively, host system 20 may simply give a pass/fail indication of security document 12.

Figure 5:
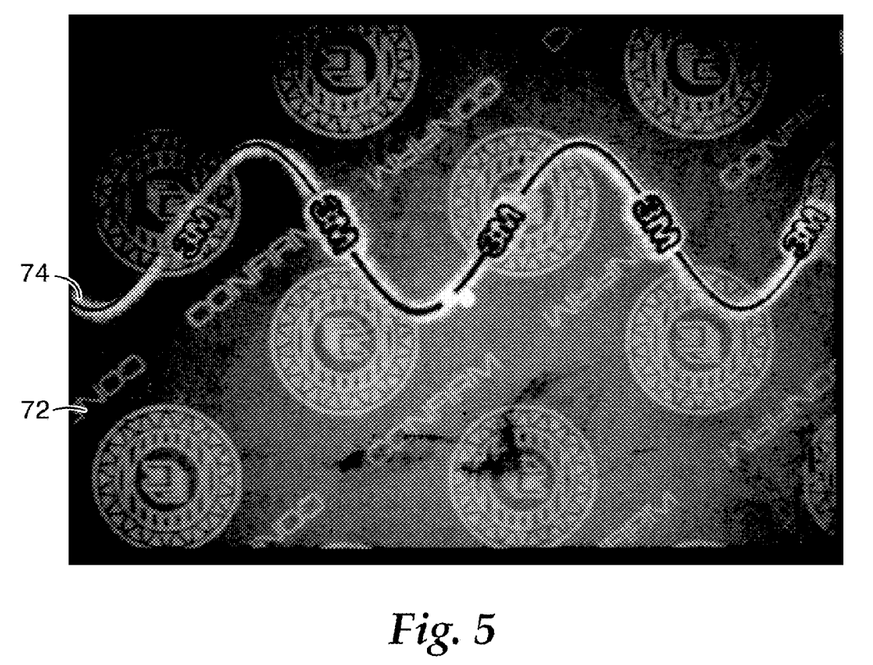
FIG. 5 is a reproduced image illustrating an example captured image of an exemplary security image on a security document.

FIG. 5 is reproduced image illustrating an example captured image 70 of an exemplary security image on a security document. Captured image 70 shows a security image having a plurality of security features. In particular, captured image 70 includes a retroreflective background pattern 72, which includes multiple instances of a reference image shown in FIG. 6, as well as an additional security feature in the form of a retroreflective virtual image 74.

As illustrated in FIG. 5, the retroreflective background pattern 72 includes a repeated pattern consisting of the word "CONFIRM" and a circular emblem design. A retroreflective sheet material having glass microspheres may be bonded to a security document into which the repeated pattern is formed. The pattern may be retroreflective, such that it is visible when viewed under retroreflected light. The additional security feature of a retroreflective virtual image 74 is formed over the background pattern and, in this example, is a wave design with the symbols "3M" appearing along the wave. Retroreflective virtual image 74 may be a floating image that may appear to move relative to the document. The captured image 70 may be captured by image capture device 18 (FIG. 1) when a security document is placed onto view frame 14.

Figure 6:
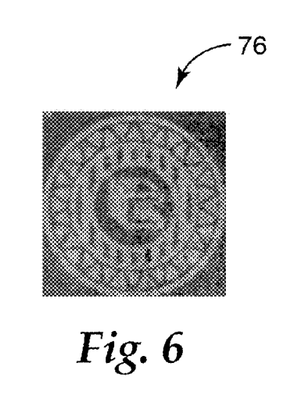
FIG. 6 is a reproduced image illustrating an exemplary reference image.

FIG. 6 is a reproduced image illustrating an exemplary reference image 76 from which retroreflective background pattern 72 was created. In this example, reference image 76 includes a retroreflective security emblem. Reference image 76 may be stored in template data structure 28, and may be manually selected by an operator of host system 20 via user interface 34 (FIG. 2) after the user has viewed captured image 70, or may be automatically selected by host system 20 by analyzing characteristics of the document. In accordance with the techniques described herein, host system 20 processes captured image 70 to identify one or more portions that sufficiently match reference image 76.

Figure 7:
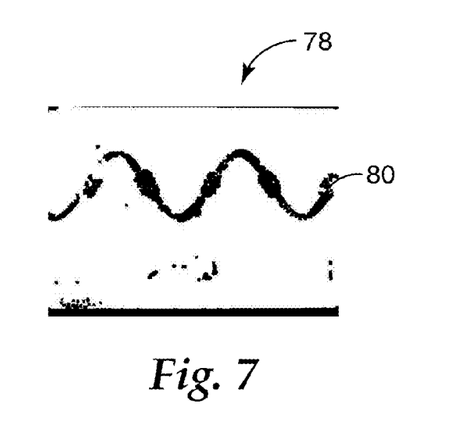
FIG. 7 is a reproduction of an example masking image detected from the example captured image of FIG. 5.

FIG. 7 is a reproduction of an example masking image 78 detected from the example captured image 70 of FIG. 5. In this example, masking image 78 was generated by "thresholding" each pixel of captured image 70. For example, each pixel of captured image 70 was analyzed to determine whether the intensity of the pixel was outside a pre-defined range, i.e., whether the pixel was very light or very dark. Based on the analysis, the corresponding pixel of the masking image 78 was set to a value of 0. All other pixels of the masking image 78 corresponding to pixels within captured image 70 that fell within the pre-defined range were set to a value of 255. In this way, masking image 78 was generated to mask out portions of the captured image 70 that may dominate or obscure the underlying background pattern 72. The method of building the masking image may vary according to a type or characteristics of the captured image.

Figure 8A:
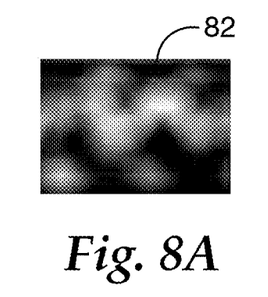
FIGS. 8A-8C show actual results obtained when different template matching techniques are performed to analyze the example captured image of FIG. 5, shown for purposes of comparison.
Figure 8B:
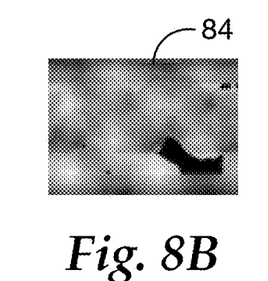
Figure 8C:
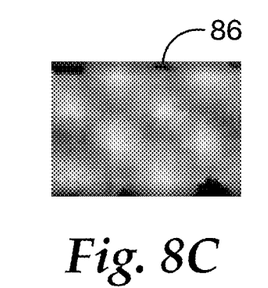

FIGS. 8A-8C show actual results obtained when different template matching techniques were performed to analyze the example captured image 70 of FIG. 5, and the results are shown for purposes of comparison. FIG. 8A shows an example matching result 82 obtained using direct fast Fourier transform (FFT) for a cross-correlation calculation, without normalization and without masking out retroreflective virtual image 74, i.e., using the numerator of equation (1). As shown in FIG. 8A, matching result 82 shows heavy interference by the additional security feature of the retroreflective virtual image as well as lighting unevenness.

FIG. 8B shows actual matching result 84 obtained using normalized cross-correlation (NCC) without masking out retroreflective virtual image 74, i.e., using equation (1) above. As shown, lighting unevenness was improved, but the results are overnormalized due to the strong signal from retroreflective virtual image 74.

FIG. 8C shows actual matching result 86 obtained using the fast masked NCC (FMNCC) techniques described herein. As can be seen from matching results 86 compared to matching results 84 and 82, the FMNCC technique provides much more distinguished and consistent matching evaluation for all eight occurrences of the reference image 76 within the captured image 70, as shown in the white peaks of the matching points.

Figure 9:
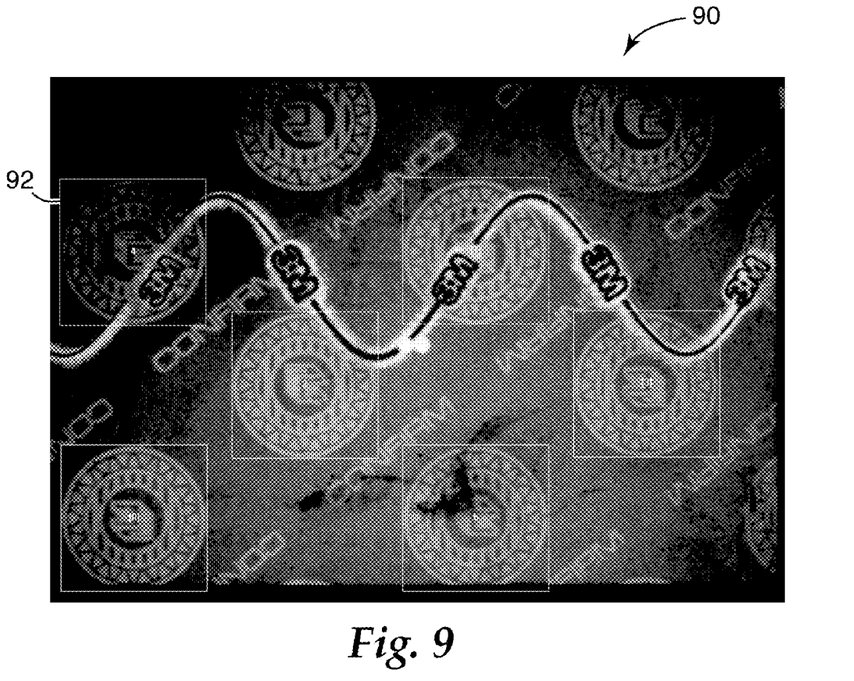
FIG. 9 illustrates an exemplary display image presented by the host system.

FIG. 9 illustrates an exemplary display image 90 presented by host system 20. For example, host system 20 may output display image 90 on display 40. In this example, host system 20 presents display image 90 to include captured image 70 of FIG. 5, and further includes identifiers marking matching regions 92 found to sufficiently match reference image 76. As shown, the matching results consist of only the matching regions for which host system 20 found the entire reference image within the captured image. Each of the matching regions 92 is marked with a square, with a number indicating the rank of the matching region displayed at the center of each square. The rank of matching regions 92 that were rotated 180° from the reference image 76 are shown in brackets.

Figure 10:
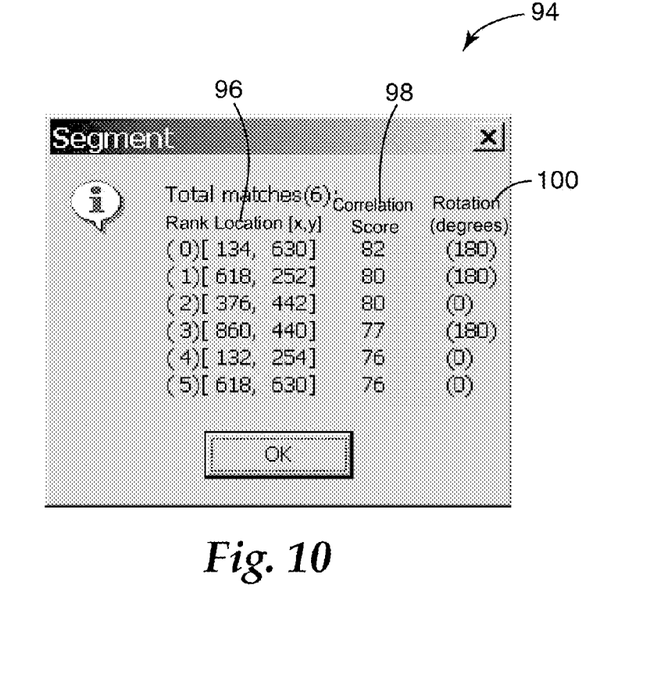
FIG. 10 is an exemplary output window presented by the host system on a display, illustrating example template matching data.

FIG. 10 is an exemplary output window 94 presented by host system 20 on display 40 illustrating example template matching data. Output window 94 may be shown on display 40 (FIG. 2) after host system 20 has analyzed captured image 70 obtained from the security document 12, or this result may be combined with other parts of security confirmation of document authenticity. As illustrated in FIG. 10, output window 94 includes a row for each of six template matches found within captured image 70. A location coordinate of the center pixel for each matching region 92 is displayed in column 96 in [x, y] form with the upper left corner as the origin. The matching regions 92 are ranked according to their correlation score, shown in column 98, which is a number between 0 and 100, 100 being the highest. Rotation column 100 indicates the rotation in degrees of each of the matching regions 92 with respect to reference image 76.

Various embodiments of the invention have been described. Although described for purposes of explanation with respect to template matching of retroreflective images within security documents, the FMNCC techniques described herein may be applied to other forms of security features and template matching situations. These and other embodiments are within the scope of the following claims.

The invention claimed is:

1. A method comprising:
   capturing an image of at least a portion of a document, wherein the portion of the document includes an image having a first retroreflective feature and a second retroreflective feature;
   generating a masking image from the captured image;
   calculating a modified normalized cross-correlation between a reference image associated with the first retroreflective feature and the captured image using the masking image; and
   outputting indicia of one or more matches between the reference image and the captured image.

2. The method of claim 1, wherein calculating the modified normalized cross-correlation between the reference image and the captured image comprises:
   applying the masking image to the captured image to obtain a masked image;
   calculating a normalized cross-correlation between the masked image and the reference image; and
   modifying the calculated normalized cross-correlation with a masking effect modifier representing the ratio of the size of the reference image to a masked area at each matching region.

3. The method of claim 2, wherein the masking effect modifier is of the form $$\left\{ \frac{\{M_t \times N_t\}}{\sum_{x,y} m(x+u, y+v)} \right\}^\alpha,$$

where $M_t$ and $N_t$ define the dimension of the reference image, $m(x, y)$ represents the masking image, and $\alpha$ represents the modification strength.

4. The method of claim 3, wherein modifying the calculated normalized cross-correlation with a masking effect modifier comprises modifying using a masking effect modifier in which $\alpha=1$.

5. The method of claim 2, wherein the second retroreflective feature is a retroreflective virtual image, and wherein applying the masking image to the captured image removes at least a portion of the retroreflective virtual image from the captured image.

6. The method of claim 2,
   wherein the masking image and the captured image are comprised of a plurality of pixels, and
   wherein generating a masking image comprises setting a pixel of the masking image to a first value when a corresponding pixel of the captured image has a brightness value outside a predefined range of brightness values, and setting the pixel of the masking image to a second value when the corresponding pixel of the captured image has a brightness value within the pre-defined range of brightness values.

7. The method of claim 6, further comprising selecting the predefined range of brightness values from among a plurality of predefined ranges of brightness values based on a type of the document.

8. The method of claim 1, further comprising determining matching regions within the captured image based on the calculated modified normalized cross-correlation.

9. The method of claim 8, wherein outputting indicia of one or more matches comprises displaying the determined matching regions and a correlation score corresponding to each determined matching region.

10. The method of claim 8, wherein outputting indicia comprises indicating a failure to find any matching regions within the captured image, wherein a failure to find any matching regions is determined based on a predefined score threshold and a minimum required number of matches.

11. The method of claim 1, wherein calculating the modified normalized cross-correlation between the reference image and the captured image comprises calculating the modified normalized cross-correlation using a fast Fourier transform.

\* \* \* \* \*

UNITED STATES PATENT AND TRADEMARK OFFICE
CERTIFICATE OF CORRECTION

PATENT NO. : 8,485,559 B2
APPLICATION NO. : 13/332451
DATED : July 16, 2013
INVENTOR(S) : Yiwu Lei It is certified that error appears in the above-identified patent and that said Letters Patent is hereby corrected as shown below:

In the Specification

Column 7

Line 25 (approx. – including equations), delete " $\overline{f}_{mu,v}]$ " and insert in place thereof -- $\overline{f}_{m(u,v)}]$ --

Column 8
Line 4, delete "a" and insert in place thereof -- σ --

Signed and Sealed this
Fifth Day of November, 2013

Teresa Stanek Rea
*Deputy Director of the United States Patent and Trademark Office*